United States Patent
Bassali et al.

(10) Patent No.: US 8,578,406 B2
(45) Date of Patent: *Nov. 5, 2013

(54) METHODS AND SYSTEMS FOR RECOVERING FROM ERRORS ASSOCIATED WITH ADVERTISEMENT STREAMS

(75) Inventors: Harpal S. Bassali, San Francisco, CA (US); Michael P. Ruffini, Methuen, MA (US); Marcelo D. Lechner, Burlington, MA (US); Armando P. Stettner, Westford, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 79 days.

This patent is subject to a terminal disclaimer.

(21) Appl. No.: 13/401,004

(22) Filed: Feb. 21, 2012

(65) Prior Publication Data
US 2012/0151520 A1 Jun. 14, 2012

Related U.S. Application Data

(63) Continuation of application No. 12/478,256, filed on Jun. 4, 2009, now Pat. No. 8,141,113.

(51) Int. Cl.
*H04N 7/10* (2006.01)

(52) U.S. Cl.
USPC ........... 725/32; 725/22; 375/240.27; 714/799

(58) Field of Classification Search
USPC .............................................. 725/32
See application file for complete search history.

(56) References Cited

U.S. PATENT DOCUMENTS

| 7,237,250 B2 * | 6/2007 | Kanojia et al. ................. 725/36 |
| 2001/0008391 A1 * | 7/2001 | Yuasa ....................... 340/310.01 |
| 2006/0227215 A1 * | 10/2006 | Yamauchi ..................... 348/193 |
| 2010/0043024 A1 * | 2/2010 | Huang et al. .................... 725/38 |

* cited by examiner

*Primary Examiner* — Robert Hance

(57) ABSTRACT

An exemplary method includes switching, by a media content access subsystem, from a program stream to an advertisement stream in response to a switching instruction received by the media content access subsystem, detecting, by the media content access subsystem, a predetermined number of markers included within the advertisement stream, the predetermined number of markers indicative of an error associated with the advertisement stream, and switching, by the media content access subsystem, from the advertisement stream to another media content stream in response to the detecting of the predetermined number of markers. Corresponding methods and systems are also disclosed.

20 Claims, 13 Drawing Sheets

METHODS AND SYSTEMS FOR RECOVERING FROM ERRORS ASSOCIATED WITH ADVERTISEMENT STREAMS

RELATED APPLICATIONS

This application is a continuation application of U.S. patent application Ser. No. 12/478,256, filed on Jun. 4, 2009, and entitled "Methods and Systems for Recovering from Errors Associated with Advertisement Streams," which is hereby incorporated by reference in its entirety.

BACKGROUND INFORMATION

The advent of set-top boxes and other media content access devices has provided users with access to a large number and variety of media content choices. For example, a user may choose to experience a variety of broadcast television programs, pay-per-view services, video-on-demand programming, Internet services, and audio programming via a set-top box.

Such media content access devices have also provided media content providers with an ability to present targeted advertising to specific users or groups of users. For example, several parallel advertisement streams may be transmitted by a video head-end or other media content delivery device during an advertisement break in programming. A media content access device may be configured to switch to one of the advertisement streams that is deemed most relevant to a user of the media content access device.

However, a head-end may at times fail to include one or more advertisements within an advertisement stream transmitted to a media content access device. Such a failure may result in blank content (e.g., a black screen) being presented to a user of the media content access device.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
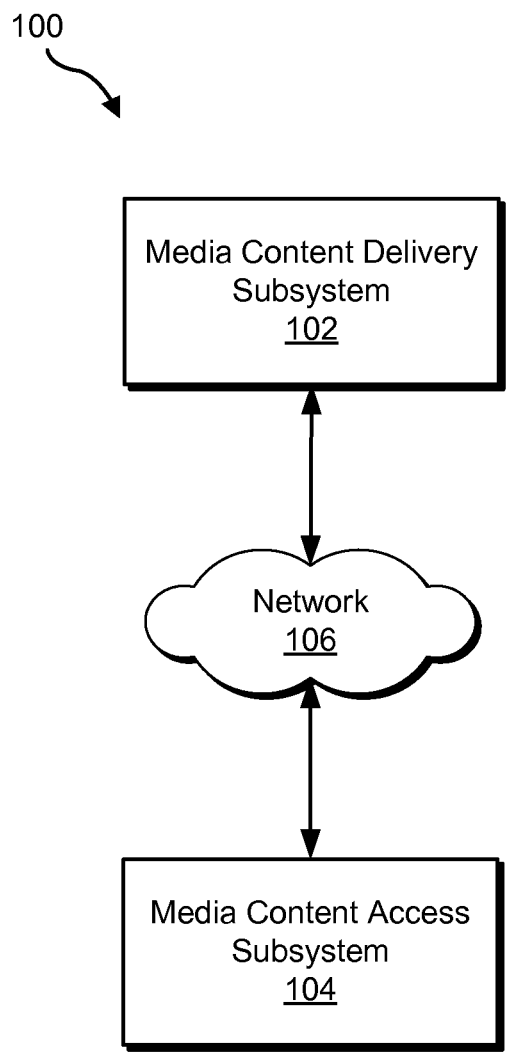
FIG. 1 illustrates an exemplary media content delivery system according to principles described herein.

Exemplary methods and systems for recovering from errors associated with advertisement streams are described herein. As described in more detail below, a media content access subsystem (e.g., a set-top box) may be configured to switch from a program stream to an advertisement stream in response to a switching instruction received by the media content access subsystem. The media content access subsystem may be further configured to determine whether a predetermined number of markers are included within the advertisement stream. The presence of such markers within the advertisement stream is indicative of an error associated with the advertisement stream (e.g., a failure to include advertisement data representative of one or more advertisements within the advertisement stream).

In some examples, if the media content access subsystem detects the presence of the predetermined number of markers within the advertisement stream, the media content access subsystem may switch to another media content stream (e.g., back to the program stream or to another advertisement stream) in order to minimize or avoid presentation of blank content included within the advertisement stream. As used herein, "blank content" refers to a black or blank display, muted audio, and/or any other content or lack of content represented by an advertisement stream without advertisement data included therein.

As used herein, the term "media content" may refer generally to any content made accessible by a media content delivery subsystem to an access subsystem. The term "media content instance" as used herein may refer generally to any television program, on-demand media program, pay-per-view media program, broadcast media program (e.g., broadcast television program), multicast media program, narrowcast media program, IPTV content, advertisement (e.g., commercial), video, movie, song, or any segment, component, or combination of these or other forms of media content that may be viewed or otherwise experienced by a user.

The term "media content stream" will be used herein to refer to any data stream comprising data representative of media content that may be presented to a user of a media content access subsystem. A media content stream may be streamed or otherwise provided over a network to the media content access subsystem in a manner that enables the media content access subsystem to begin presenting (e.g., displaying, playing back, recording for subsequent playback, etc.) a media content instance represented by the media content stream without having to first download the entire media content instance.

As will be described in more detail below, a media content stream may include a program stream, an advertisement stream, and/or any other media content stream as may serve a particular application. A "program stream" refers to a media content stream comprising data representative of one or more media content programs that may be presented to a user of an access subsystem. A "media content program" includes any media content instance that may be presented to a user other than advertisements. An "advertisement stream" refers to a media content stream comprising data representative of one or more advertisements that may be presented to a user of an access subsystem.

FIG. 1 illustrates an exemplary media content delivery system 100 (or simply "system 100"). System 100 may include a media content delivery subsystem 102 (or simply "delivery subsystem 102") and a media content access subsystem 104 (or simply "access subsystem 104") in communication with one another via a network 106. Access subsystem 104 may be configured to communicate with and receive one or more media content streams containing data representative of media content and/or data associated with media content from delivery subsystem 102.

In certain embodiments, system 100 or one or more components of system 100 may include any computer hardware and/or computer-implemented instructions (e.g., software), or combinations of computer-implemented instructions and hardware, configured to perform one or more of the processes described herein. In particular, it should be understood that components of system 100 may be implemented on one physical computing device or may be implemented on more than one physical computing device. Accordingly, components of system 100 may include any one of a number of computing devices, and may employ any of a number of computer operating systems.

Accordingly, one or more of the processes described herein may be implemented at least in part as instructions executable by one or more computing devices. In general, a processor (e.g., a microprocessor) receives instructions, from a computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other medium from which a computer can read.

Delivery subsystem 102 and access subsystem 104 may communicate using any suitable communication technologies, devices, networks, media, and protocols supportive of remote data communications. For example, delivery subsystem 102 and access subsystem 104 may communicate over network 106 using any communication platforms and technologies suitable for transporting media content and/or communication signals, including known communication technologies, devices, transmission media, and protocols supportive of remote data communications, examples of which include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), Time Division Multiple Access ("TDMA") technologies, radio frequency ("RF") signaling technologies, wireless communication technologies (e.g., Bluetooth, Wi-Fi, etc.), optical transport and signaling technologies, live transmission technologies (e.g., media streaming technologies), media file transfer technologies, in-band and out-of-band signaling technologies, and other suitable communications technologies.

Network 106 may include one or more networks or types of networks (and communication links thereto) capable of carrying communications, media content, and/or data signals between delivery subsystem 102 and access subsystem 104. For example, network 106 may include, but is not limited to, one or more wireless networks (e.g., satellite media broadcasting networks or terrestrial broadcasting networks), mobile telephone networks (e.g., cellular telephone networks), closed media networks, open media networks, subscriber television networks (e.g., broadcast, multicast, and/or narrowcast television networks), closed communication networks, open communication networks, satellite networks, cable networks, hybrid fiber coax networks, optical fiber networks, broadband networks, narrowband networks, the Internet, wide area networks, local area networks, public networks, private networks, packet-switched networks, and any other networks capable of carrying data and/or communications signals between delivery subsystem 102 and access subsystem 104. Communications between delivery subsystem 102 and access subsystem 104 may be transported using any one of above-listed networks, or any combination or sub-combination of the above-listed networks.

Figure 2:
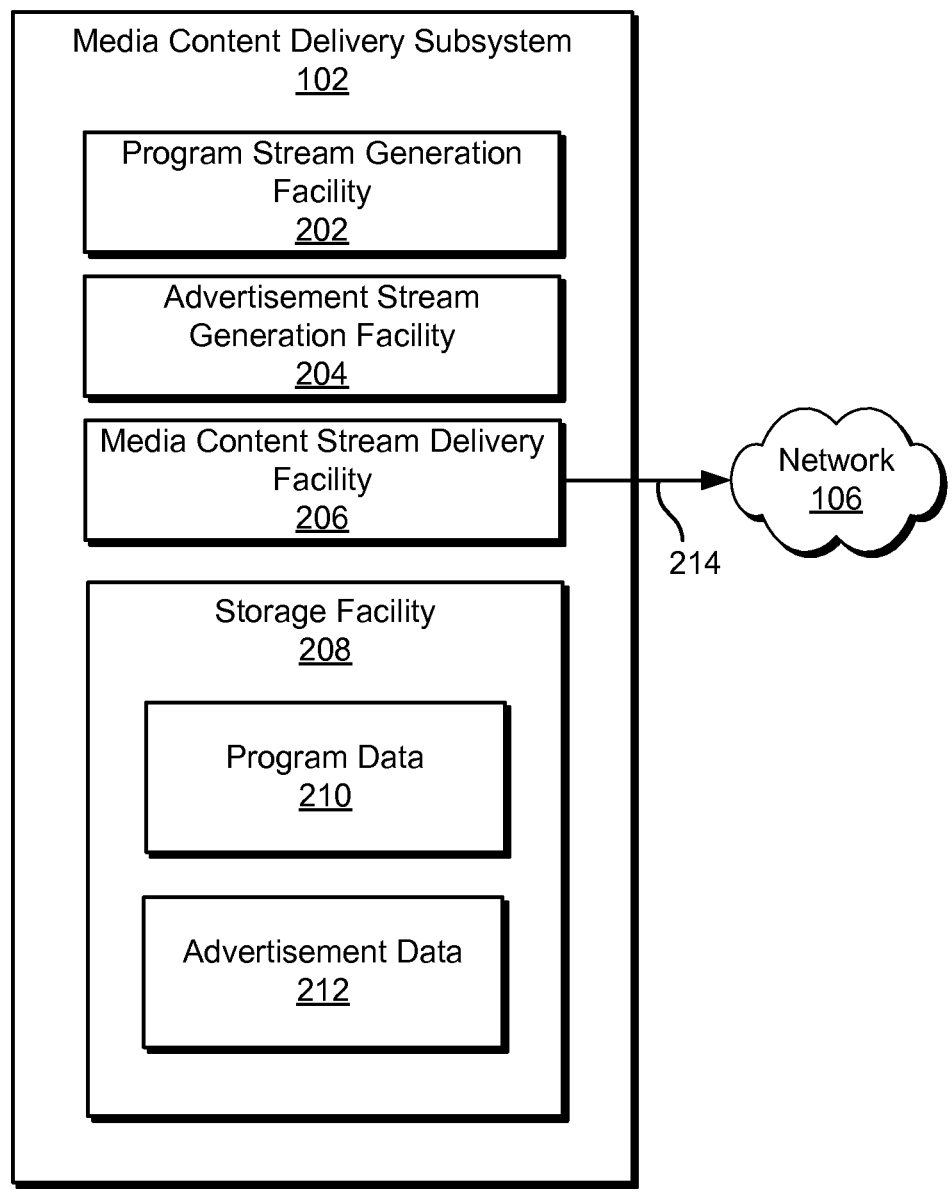
FIG. 2 illustrates exemplary components of a media content delivery subsystem according to principles described herein.

FIG. 2 illustrates exemplary components of delivery subsystem 102. As shown in FIG. 2, delivery subsystem 102 may include a program stream generation facility 202, an advertisement stream generation facility 204, a media content stream delivery facility 206, and a storage facility 208, which may be in communication with one another using any suitable communication technologies. It will be recognized that although facilities 202-208 are shown to be separate facilities in FIG. 2, any of those facilities may be combined into a single facility as may serve a particular application. For example, program stream generation facility 202 and advertisement stream generation facility 204 may be combined into a single media content stream generation facility.

Program stream generation facility 202 may be configured to generate one or more program streams comprising data representative of one or more media content programs that may be presented to a user of access subsystem 104. Program stream generation facility 202 may be configured to generate a program stream in any suitable manner as may serve a particular application. For example, a program stream may be generated in accordance with a Moving Pictures Expert Group ("MPEG") format (e.g., "MPEG-2" or "MPEG-4"). In some examples, the data representative of one or more media content programs may be stored as program data 210 within storage facility 208.

Advertisement stream generation facility 204 may be configured to generate one or more advertisement streams comprising data representative of one or more advertisements that may be presented to a user of access subsystem 104. In some examples, the data representative of one or more advertisements may be stored as advertisement data 212 within storage facility 208.

As will be described in more detail below, an advertisement stream generated by advertisement stream generation facility 204 may initially have a plurality of markers periodically embedded or included therein. When data representative of one or more advertisements is inserted into the advertisement stream, the advertisement data may be configured to replace one or more of the markers within the advertisement stream. Hence, as will be described in more detail below, if access subsystem 104 detects the presence of a predetermined number of markers within the advertisement stream, access subsystem 104 may determine that an error is associated with the advertisement stream and switch to another media content stream in order to avoid presentation of blank content to a user of access subsystem 104.

Advertisement stream generation facility 204 may be configured to generate an advertisement stream in any suitable manner as may serve a particular application. For example, an advertisement stream may be generated in accordance with a MPEG format, as will be described in more detail below.

Media content stream delivery facility 206 may be configured to transmit or otherwise deliver one or more media content streams (e.g., program streams and/or advertisement streams) to access subsystem 104 over network 106. An exemplary transmission of a media content stream over network 106 is represented as arrow 214 in FIG. 2.

In some examples, media content stream delivery facility 206 may be configured to broadcast, multicast, and/or narrowcast one or more media content streams. For example, media content stream delivery facility 206 may broadcast and/or multicast one or more television programs over network 106 in accordance with a television broadcast and/or multicast schedule. As another example, media content stream delivery facility 206 may narrowcast one or more television programs over network 106 in response to requests for the television programs.

Media content stream delivery facility 206 may additionally or alternatively be configured to transmit a switching instruction to access subsystem 104. As will be described in more detail below, the switching instruction may be configured to direct access subsystem 104 to switch from a program stream to an advertisement stream.

Figure 3:
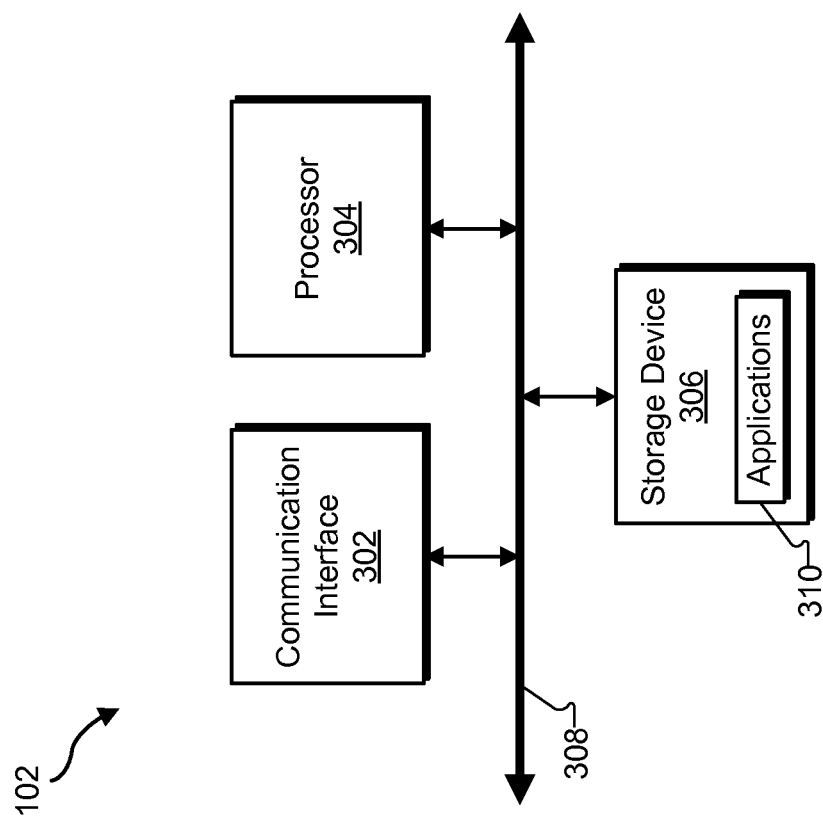
FIG. 3 illustrates an exemplary implementation of the media content delivery subsystem of FIG. 2 according to principles described herein.

FIG. 3 illustrates an exemplary implementation of delivery subsystem 102. As shown in FIG. 3, delivery subsystem 102 may include a communication interface 302, a processor 304, and a storage device 306 communicatively coupled one to another via a communication infrastructure 308. The components of delivery subsystem 102 may communicate with one another, including sending data to and receiving data from one another, using any suitable communication technologies. Moreover, the components of delivery subsystem 102 may be implemented on any computing device or combination of computing devices, such as one or more servers, personal computers, or the like.

While an exemplary implementation of delivery subsystem 102 is shown in FIG. 3, the components illustrated in FIG. 3 are not intended to be limiting. Additional or alternative components may be used in other embodiments. Components of the delivery subsystem 102 shown in FIG. 3 will now be described in additional detail.

Communication interface 302 may be configured to communicate with one or more computing devices, including access subsystem 104. In particular, communication interface 302 may be configured to transmit and/or receive communication signals, media content, and/or data to/from access subsystem 104. Examples of communication interface 302 include, without limitation, a wired network interface (such as a network interface card), a wireless network interface (such as a wireless network interface card), a modem, a transmitter, a transceiver, and any other suitable interface. In at least one embodiment, communication interface 302 may provide a direct connection between delivery subsystem 102 and access subsystem 104 via a direct link to a network, such as the Internet. Communication interface 302 may additionally or alternatively provide such a connection through, for example, a local area network (such as an Ethernet network), a personal area network, a telephone or cable network, a cellular telephone connection, a satellite data connection, or any other suitable connection.

In some examples, communication interface 302 may be configured to transmit (e.g., broadcast, multicast, and/or narrowcast) data representative of one or more media content instances to access subsystem 104. Such data may be transmitted in one or more media content streams, as one or more data files, or in any other suitable manner as may serve a particular application. Communication interface 302 may be configured to interface with any suitable communication media, protocols, and formats, including any of those mentioned above.

Processor 304 generally represents any type or form of processing unit capable of processing data or interpreting, executing, and/or directing execution of one or more of the instructions, processes, and/or operations described herein. Processor 304 may direct execution of operations in accordance with one or more applications 310 or other computer-executable instructions such as may be stored in storage device 306 or another computer-readable medium. As an example, processor 304 may be configured to process data, including modulating, encoding, and/or otherwise preparing data (e.g., media content data) for transmission by communication interface 302.

Storage device 306 may include one or more data storage media, devices, or configurations and may employ any type, form, and combination of data storage media and/or device. For example, storage device 306 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 306. For example, data representative of one or more executable applications 310 configured to direct processor 304 to perform any of the operations described herein may be stored within storage device 306. In some examples, data may be arranged in one or more databases residing within storage device 306.

In some examples, program stream generation facility 202, advertisement stream generation facility 204, media content stream delivery facility 206, and/or storage facility 208 may be implemented by or within one or more components of delivery subsystem 102 shown in FIG. 3. For example, one or more applications 310 residing within storage device 306 may be configured to direct processor 304 to perform one or more processes or functions associated with program stream generation facility 202, advertisement stream generation facility 204, and/or media content stream delivery facility 206. Likewise, storage facility 208 may be implemented by or within storage device 306. For example, program data 210 and/or advertisement data 212 may be stored within storage device 306.

Figure 4:
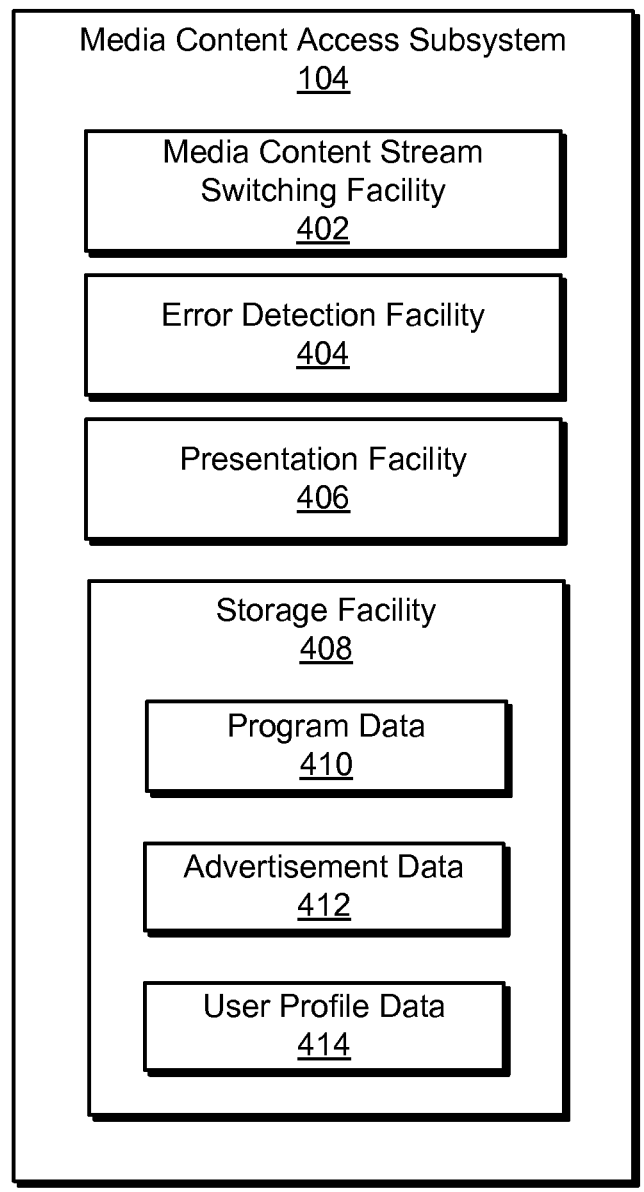
FIG. 4 illustrates exemplary components of a media content access subsystem according to principles described herein.

FIG. 4 illustrates exemplary components of access subsystem 104. As shown in FIG. 4, access subsystem 104 may include a media content stream switching facility 402, an error detection facility 404, a presentation facility 406, and a storage facility 408, which may be in communication with one another using any suitable communication technologies. It will be recognized that although facilities 402-408 are shown to be separate facilities in FIG. 4, any of those facilities may be combined into a single facility as may serve a particular application.

Media content stream switching facility 402 may be configured to switch between various media content streams delivered to access subsystem 104 by delivery subsystem 102. As used herein, "switching" from a first media content stream to a second media content stream refers to any action performed by media content stream switching facility 402 that results in access subsystem 104 switching from presenting the first media content stream to a user to presenting the second media content stream to the user. For example, media content stream switching facility 402 may direct access subsystem 104 to tune away from a content channel carrying the first media content stream to a content channel carrying the second media content stream or otherwise select the second media content stream for presentation to a user of access subsystem 104.

In some examples, media content stream switching facility 402 may be configured to switch from a program stream to an advertisement stream in response to a switching instruction transmitted from provider subsystem 102 to access subsystem 104. To illustrate, access subsystem 104 may be presenting a program represented by a program stream to a user when it receives a switching instruction from provider subsystem 102. In response to the switching instruction, media content stream switching facility 402 may direct access subsystem 104 to switch to an advertisement stream to present one or more advertisements to the user. Examples of such switching operations will be given below.

Error detection facility 404 may be configured to detect one or more errors associated with an advertisement stream. For example, error detection facility 404 may be configured to detect a failure to include data representative of at least one advertisement within an advertisement stream. To this end, as will be described in more detail below, error detection facility 404 may be configured to monitor for and detect a presence of a predetermined number of markers included within an advertisement stream transmitted to access subsystem 104. If the predetermined number of markers are detected, media content stream switching facility 402 may switch from the advertisement stream to another media content stream (e.g., back to the program stream or to another advertisement stream). In this manner, presentation of blank content to a user may be minimized or avoided.

Presentation facility 406 may be configured to control a presentation of media content to a user of access subsystem 104. For example, presentation facility 406 may be configured to display or otherwise present one or more media content programs, one or more advertisements, and/or any other media content to a user. In some examples, data representative of such media content is extracted from a media content stream by access subsystem 104 and stored within storage facility 408 as program data 410 and advertisement data 412.

Presentation facility 406 may be further configured to control the presentation of media content to a user of access subsystem 104 in accordance with a user profile associated with the user. Data representative of the user profile may be stored within storage facility 408 as user profile data 414.

Figure 5:
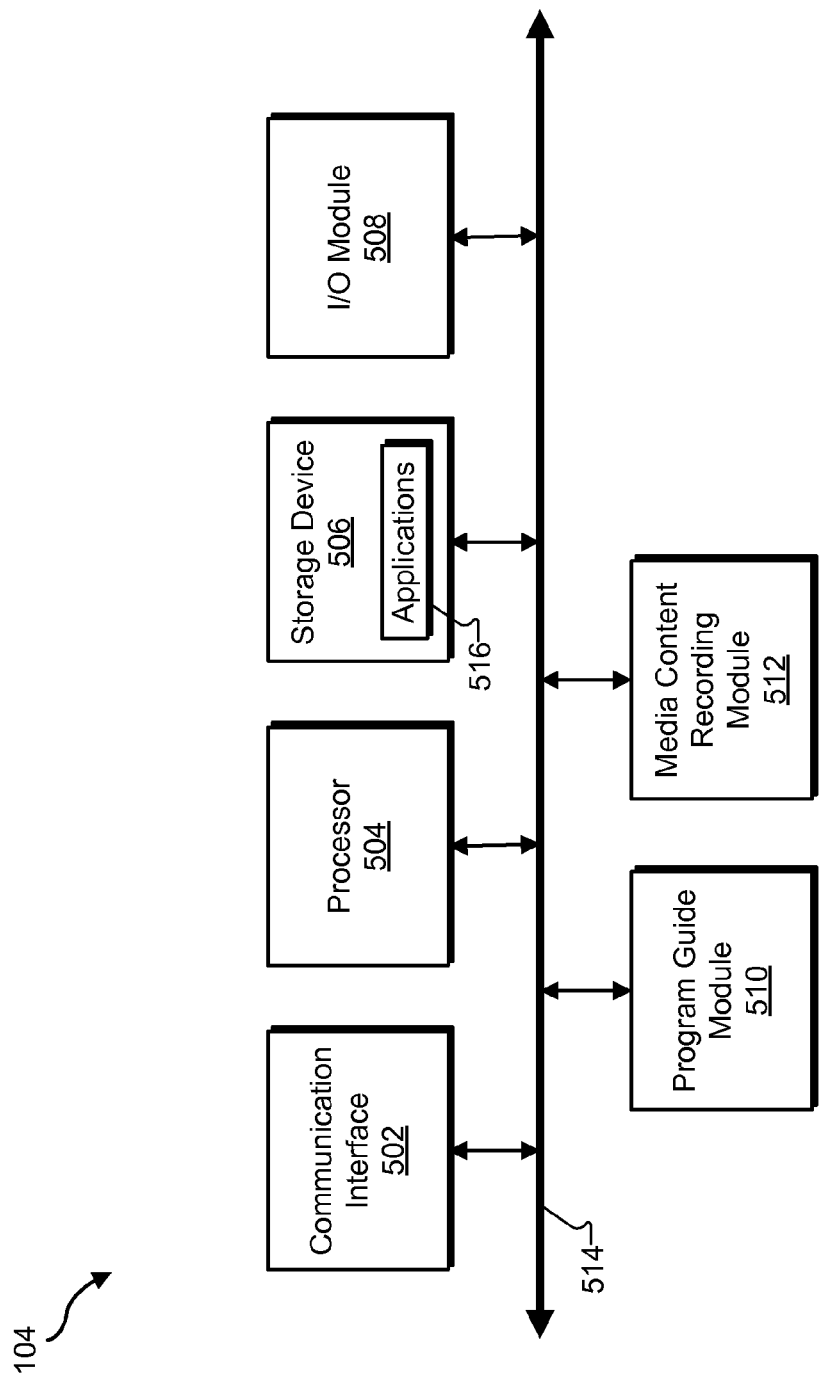
FIG. 5 illustrates an exemplary implementation of the media content access subsystem of FIG. 4 according to principles described herein.

FIG. 5 illustrates an exemplary implementation of access subsystem 104. As shown in FIG. 5, access subsystem 104 may include a communication interface 502, a processor 504, a storage device 506, an input/output ("I/O") module 508, a program guide module 510, and a media content recording module 512 communicatively coupled one to another via a communication infrastructure 514. The components of access subsystem 104 shown in FIG. 5 may communicate with one another, including sending data to and receiving data from one another, using any suitable communication technologies.

While an exemplary implementation of access subsystem 104 is shown in FIG. 5, the components illustrated in FIG. 5 are not intended to be limiting. Additional or alternative components may be used in other embodiments. Components of the access subsystem 102 shown in FIG. 5 will now be described in additional detail.

Communication interface 502 may be configured to communicate with one or more computing devices, including delivery subsystem 102. In particular, communication interface 502 may be configured to transmit and/or receive communication signals, media content, and/or data to/from delivery subsystem 102. Examples of communication interface 502 include, without limitation, a wired network interface (such as a network interface card), a wireless network interface (such as a wireless network interface card), a modem, and any other suitable interface. In at least one embodiment, communication interface 502 may provide a direct connection between delivery subsystem 102 and access subsystem 104 via a direct link to a network, such as the Internet. Communication interface 502 may additionally or alternatively provide such a connection through, for example, a local area network (such as an Ethernet network), a personal area network, a telephone or cable network, a cellular telephone connection, a satellite data connection, or any other suitable connection.

As mentioned, delivery subsystem 102 may transmit (e.g., broadcast, multicast, and/or narrowcast) media content streams representative of one or more media content instances. Communication interface 502 may be configured to receive such media content streams such that the media content streams may be processed by access subsystem 104. To this end, communication interface 502 may include any device, logic, and/or other technologies suitable for receiving signals, media content streams, and/or any other data as may serve a particular application. Communication interface 502 may be configured to interface with any suitable communication media, protocols, and formats, including any of those mentioned above.

In certain embodiments, delivery subsystem 102 may be configured to transmit and access subsystem 104 may be configured to receive media content streams representative of various media content instances in accordance with a transmission schedule. The transmission schedule may specify that particular media content instances are to be transmitted at scheduled transmission times and on certain media content carrier channels. As used herein, the term "scheduled transmission time" or "scheduled transmission" may refer generally to any period of time during which a media content instance is to be transmitted to access subsystem 104. The term "media content carrier channel" or "content channel" as used herein may refer generally to any carrier of media content, including, but not limited to, media (e.g., television) channels, streams, addresses, frequencies or other carriers of media content.

Communication interface 502 may be configured to selectively identify, receive, and/or process appropriate media content streams at the scheduled transmission times and on the appropriate media content carrier channels. For instance, in certain implementations communication interface 502 may include a tuner configured to selectively receive media content carried on a particular media content carrier channel. The tuner may be tuned to a particular media content carrier channel such that the media content carried on the media content carrier channel is received and may be processed by access subsystem 104.

In some examples, communication interface 502 may include multiple tuners such that media content carried on different media content carrier channels may be concurrently received for processing by the access subsystem 104. For example, communication interface 502 may include a first tuner configured to receive media content carried on an analog video signal and a second tuner configured to concurrently receive media content carried on a digital compressed signal.

While one or more tuners may be used to receive various types of media content-carrying signals (e.g., media content streams) transmitted by delivery subsystem 102, additionally or alternatively, communication interface 502 may be configured to receive other types of signals (e.g., other types of media content carrying signals) from delivery subsystem 102 and/or one or more other sources without using a tuner. For example, delivery subsystem 102 may transmit media content streams in the form of data packets (e.g., IP-based data packets) that can be received without using a tuner. For such types of signals, communication interface 502 may receive and forward the signals directly to other components of access subsystem 104 without the signals going through a tuner. For an IP-based signal, for example, communication interface 502 may function as an IP receiver.

Processor 504 generally represents any type or form of processing unit capable of processing data or interpreting, executing, and/or directing execution of one or more of the instructions, processes, and/or operations described herein. Processor 504 may direct execution of operations in accordance with one or more applications 604 or other computer-executable instructions such as may be stored in storage device 506 or another computer-readable medium. As an example, processor 504 may be configured to process data, including demodulating, decoding, and/or parsing data (e.g., data representative of media content received from delivery subsystem 102 by communication interface 502), and encoding and modulating data for transmission by communication interface 502.

Storage device 506 may include one or more data storage media, devices, or configurations and may employ any type, form, and combination of data storage media and/or device. For example, storage device 506 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 506. For example, data representative of one or more executable applications 516 configured to direct processor 504 to perform any of the operations described herein may be stored within storage device 506. In some examples, data may be arranged in one or more databases residing within storage device 506.

I/O module 508 may be configured to receive user input and provide user output and may include any hardware, firmware, software, or combination thereof supportive of input and output capabilities. For example, I/O module 508 may include one or more devices for capturing user input, including, but not limited to, a microphone, speech recognition technologies, keyboard or keypad, touch screen component (e.g., touch screen display), receiver (e.g., an RF or infrared receiver), and one or more input buttons.

I/O module 508 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 508 is configured to provide graphical data to a display for presentation to a user. The graphical data may representative of one or more graphical user interfaces ("GUIs"), GUI views, media content views, and/or any other view as may serve a particular application.

Program guide module 510 may be configured to maintain and operate on program guide data. As mentioned above, media content instances may be transmitted by delivery subsystem 102 at scheduled transmission times and on certain media content carrier channels. To assist access subsystem 104 and/or a user of access subsystem 104 with reception of media content instances at appropriate scheduled transmission times and on appropriate media content carrier channels, program guide data may be received by communication interface 502 from delivery subsystem 102 and/or from another source. The program guide data may be stored in storage device 506.

Program guide module 510 may be configured to arrange and provide graphical data representative of a program guide view to I/O module 508 for inclusion in a GUI. I/O module 508 may generate and provide a GUI including the program guide view to a display for presentation to a user. A program guide view may include a graphical arrangement of program guide data, one or more program guide tools (e.g., program guide navigation, search, and/or filter tools), one or more graphical selectors for navigating and highlighting selectable options, and/or other graphics. Typically, a program guide view presents at least a portion of a media content transmission schedule to a user. The user may utilize the program guide view to access information about media content instances and scheduled transmission times and channels associated with the media content instances.

Media content recording module 512 may be configured to record data representative of media content to storage device 506. The recording of a media content instance is typically performed during a transmission time slot when data representative of the media content instance is received from delivery subsystem 102 as described above. For example, during transmission of a media content instance from delivery subsystem 102 to access subsystem 104 on a media content carrier channel, communication interface 502 may receive data representative of the media content instance on the media content carrier channel, and media content recording module 512 may direct that the received data representative of the media content instance be stored to storage device 506. Once stored, the data representative the media content instance may be accessed and processed as may suit a particular application, including providing data representative of the media content instance to a display for presentation to a user.

In some examples, media content stream switching facility 402, error detection facility 404, presentation facility 406, and/or storage facility 408 may be implemented by or within one or more components of access subsystem 104 shown in FIG. 5. For example, one or more applications 516 residing within storage device 506 may be configured to direct processor 504 to perform one or more processes or functions associated with media content stream switching facility 402, error detection facility 404, and/or presentation facility 406. Likewise, storage facility 408 may be implemented by or within storage device 506. For example, program data 410, advertisement data 412, and/or user profile data 414 may be stored within storage device 506.

Figure 6:
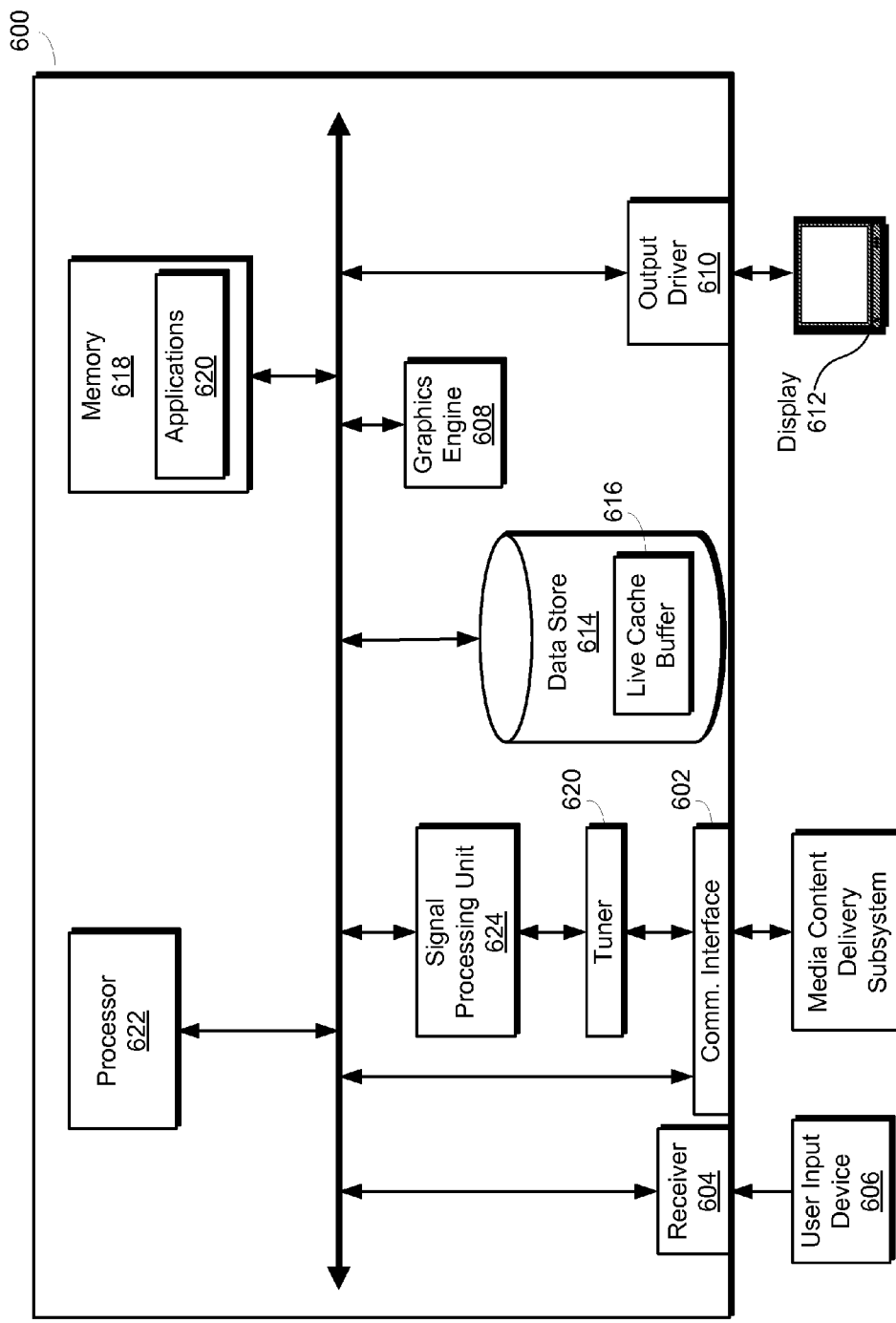
FIG. 6 illustrates an exemplary media content access device according to principles described herein.

FIG. 6 illustrates an exemplary media content access device 600 having access subsystem 104 implemented thereon. Device 600 may include one or more of the components of access subsystem 104 shown in FIG. 5 and may be configured to perform one or more of the processes and/or operations described herein. Device 600 may include, but is not limited to, a set-top box, a media content processing device, a communications device, an audio device, a mobile device (e.g., a mobile phone device), a handheld device, a personal computer, a phone device (e.g., a Verizon Hub device), a personal-digital assistant device, a gaming device, a DVR device (e.g., a personal video recording PVR device), a television device, and/or any device configured to perform one or more of the processes and/or operations described herein.

As shown in FIG. 6, device 600 may include a communication interface 602 configured to receive media content (e.g., media content) and/or data (e.g., metadata, program guide data, and/or any other data associated with media content) in any acceptable format from delivery subsystem 102 or from any other suitable external source. Communication interface 602 may include any device, logic, and/or other technologies suitable for receiving signals and/or data representative of media content and/or other types of media content or data. Communication interface 602 may be configured to interface with any suitable communication media, protocols, and formats, including any of those mentioned above.

Device 600 may also include a receiver 604 configured to receive user input signals from a user input device 606. User input device 606 may include, for example, a remote control device or any other suitable input device and may be configured to communicate with receiver 604 via a wireless link, electrical connection, or any other suitable communication link.

Device 600 may include a graphics engine 608 and an output driver 610. Graphics engine 608 may be configured to generate graphics to be provided to output driver 610, which may be configured to interface with or drive a display 612. Output driver 610 may provide output signals to display 612, the output signals including graphical media content (e.g., media content and/or program guide media content) generated by graphics engine 608 and to be presented by display 612 for experiencing by a user. For example, output driver 610 may provide a data representative of a GUI including a program guide view to display 612 for presentation to the user. Graphics engine 608 and output driver 610 may include any combination of hardware, software, and/or firmware as may serve a particular application.

Data store 614 may include one or more data storage media, devices, or configurations and may employ any type, form, and combination of storage media. For example, data store 614 may include, but is not limited to, a hard drive, network drive, flash drive, magnetic disc, optical disc, or other non-volatile storage unit. Media content and/or data associated with media content may be temporarily and/or permanently stored in data store 614.

Data store 614 is shown to be included within device 600 in FIG. 6 for illustrative purposes only. It will be understood that data store 614 may additionally or alternatively be located external to device 600.

Data store 614 may include one or more live cache buffers 616. Live cache buffer 616 may additionally or alternatively reside in memory 618 or in a storage device external to device 600. In some examples, media content data may be temporarily stored in live cache buffer 616 to facilitate viewing and/or recording of the media content.

Device 600 may include memory 618. Memory 618 may include, but is not limited to, FLASH memory, random access memory ("RAM"), dynamic RAM ("DRAM"), other suitable computer-readable media, or any combination or subcombination thereof. In some examples, one or more applications 620 configured to run on or otherwise be executed by device 600 may reside in memory 618.

Device 600 may include one or more tuners 620. Tuner 620 may be configured to selectively receive media content carried on a particular media content carrier channel such that the media content may be processed by device 600. In some examples, media content received by tuner 620 may be temporarily buffered, or stored, in the live cache buffer 616. If there are multiple tuners 620, there may be a live cache buffer 616 corresponding to each of the tuners 620.

While tuner 620 may be used to receive certain media content-carrying signals transmitted by delivery subsystem 102, device 600 may be configured to receive other types of media content signals (including media content signals and/or program guide data signals) from delivery subsystem 102 and/or one or more other sources without using a tuner. For example, delivery subsystem 102 may transmit digital streams of data packets (e.g., IP-based data packets) that can be received without using a tuner. For such types of media content signals, communication interface 602 may receive and forward the signals directly to other components of device 600 (e.g., processor 622 or signal processing unit 624, described in more detail below) without the signals going through tuner 620. For an IP-based signal, for example, signal processing unit 624 may function as an IP receiver.

Device 600 may include at least one processor, such as processor 622, configured to control and/or perform one or more operations of device 600. Device 600 may also include a signal processing unit 624 configured to process incoming media content. Signal processing unit 624 may be configured, for example, to demodulate and parse encoded digital media content. In some examples, device 600 may include one or more signal processing units 624 corresponding to each of the tuners 620.

As mentioned, it is often desirable to present targeted advertising to a user of access subsystem 104. To this end, delivery subsystem 102 may be configured to generate a plurality of advertisement streams. Access subsystem 104 may determine which of the advertisement streams contains an advertisement deemed most relevant to a user thereof and switch to that advertisement stream so that the advertisement may be presented to the user. The determination may be made in accordance with information provided by delivery subsystem 102 to access subsystem 104 describing the type of advertisements contained within the advertisement streams, a user profile associated with the user, and/or any other information as may serve a particular application.

To illustrate, a user may be viewing a sports program represented by a particular program stream when a scheduled advertisement break occurs. During the advertisement break, access subsystem 104 may switch to one of a plurality of available advertisement streams in order to present one or more advertisements to the user. A user profile associated with the user may indicate that the user is male, twenty years old, and enjoys repairing cars. Based on this information, access subsystem 104 may switch to an advertisement stream that includes an advertisement for an auto parts store.

However, in some instances, one or more errors may be associated with an advertisement stream to which access subsystem 104 switches. For example, an error may occur within advertisement stream generation facility 204 that prevents advertisement data from being included within an advertisement stream that is delivered to access subsystem 104. Additionally or alternatively, delivery subsystem 102 may fail to deliver some or all of an advertisement stream to access device 104.

In some examples, an error notification may be transmitted to access subsystem 104 upon occurrence of an error associated with an advertisement stream. However, the error notification may not be received in time for access subsystem 104 to compensate for the error. Hence, access subsystem 104 may still switch to the failed advertisement stream, thereby resulting in blank content (e.g., a blank screen or muted audio) being presented to a user of access subsystem 104.

The systems and methods described herein may facilitate detection of and recovery from errors associated with advertisement streams accessed by access subsystem 104. As will be described in more detail below, such systems and methods may minimize or entirely eliminate periods of blank content being presented to a user, thus resulting in a more seamless media content access experience for the user.

Figure 7:
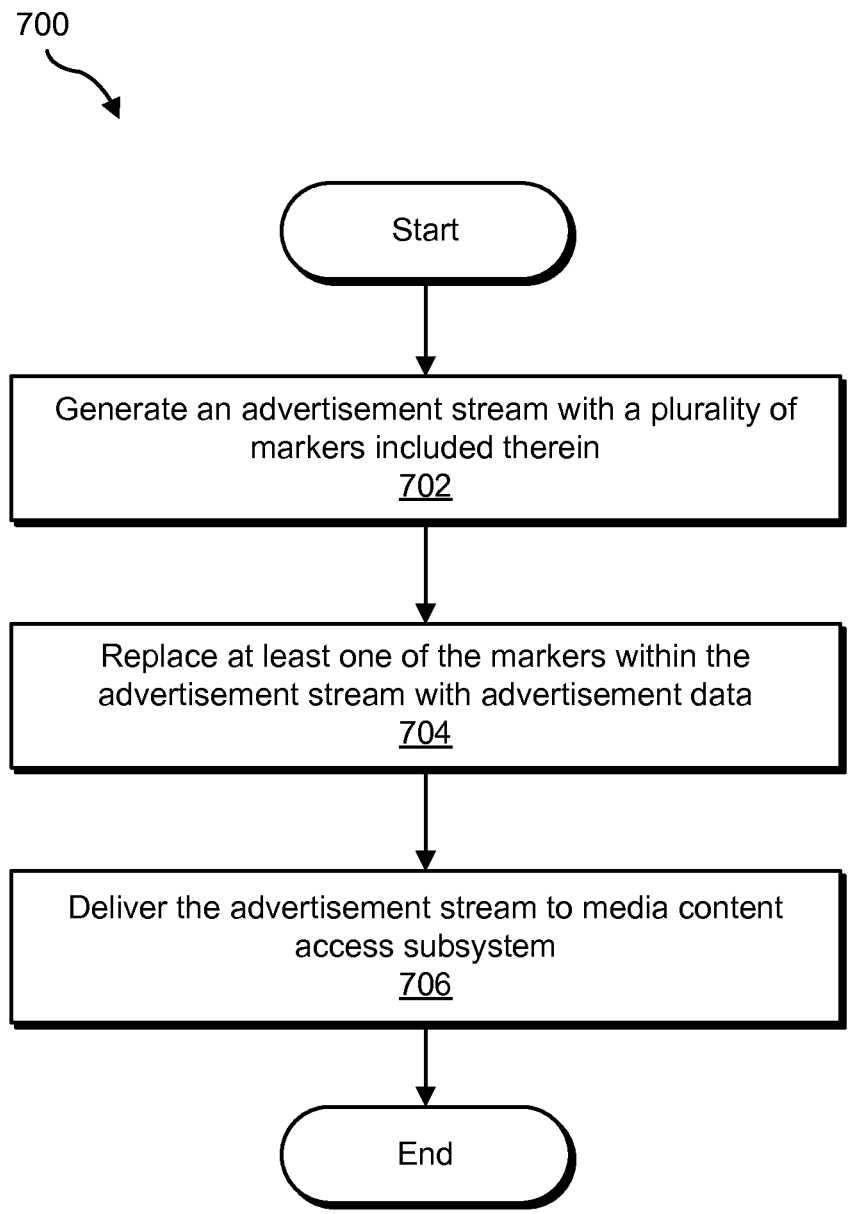
FIG. 7 illustrates an exemplary method of providing an advertisement stream to a media content access subsystem according to principles described herein.

FIG. 7 illustrates an exemplary method 700 of providing an advertisement stream to access subsystem 104. While FIG. 7 illustrates exemplary steps according to one embodiment, other embodiments may omit, add to, reorder, and/or modify any of the steps shown in FIG. 7.

Figure 8A:
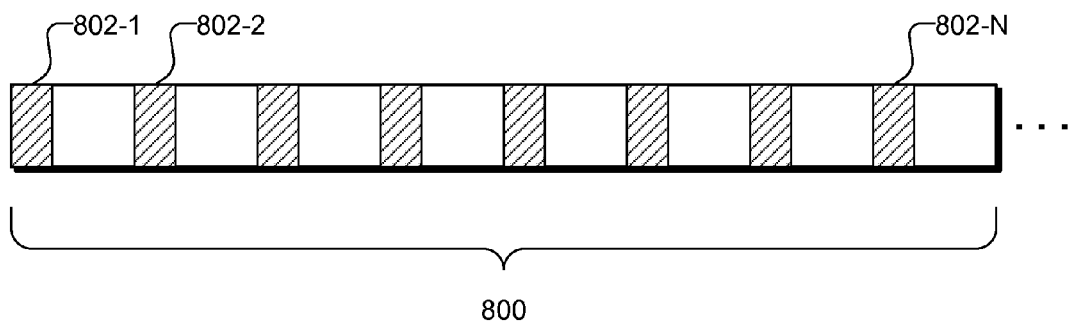
FIG. 8A shows an exemplary advertisement stream with a plurality of markers included therein according to principles described herein.

In step 702, an advertisement stream is generated with a plurality of markers included therein. For example, the advertisement stream may be generated by advertisement stream generation facility 204 in any suitable manner. To illustrate, FIG. 8A shows an exemplary advertisement stream 800 with a plurality of markers 802-1 through 802-N (collectively referred to herein as "markers 802") included therein. In some examples, each marker 802 includes a sequence of bytes identifiable by access subsystem 104. The number of bytes included within each marker 802 may vary as may serve a particular application.

As shown in FIG. 8A, markers 802 may be periodically spaced within advertisement stream 800. Any suitable number of bytes may separate each marker 802 one from another within advertisement stream 800. For example, markers 802 may be separated such that a marker 802 is detected by access subsystem 104 each second. The separating bytes may include any type of data (e.g., placeholder data) as may serve a particular application. In some alternative examples, markers 802 may be sequentially included within advertisement stream 800 without separation bytes therebetween.

Figure 8B:
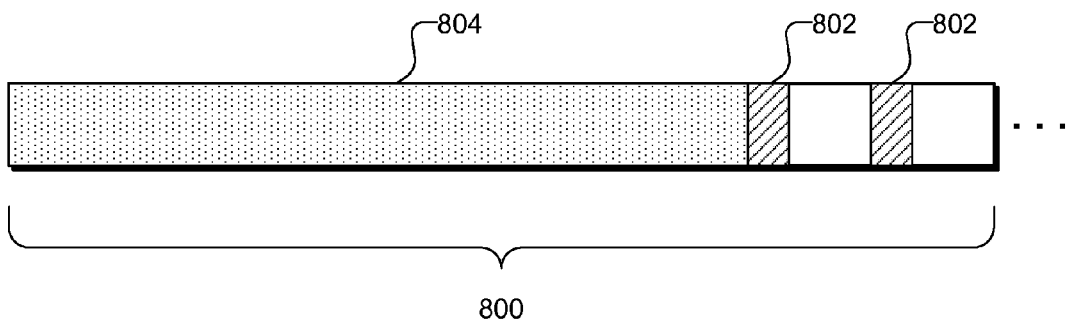
FIG. 8B shows advertisement data included within the advertisement stream of FIG. 8A according to principles described herein.

In step 704 of FIG. 7, at least one of the markers 802 within the advertisement stream is replaced with advertisement data representative of one or more advertisements. For example, advertisement stream generation facility 204 may replace at least one of the markers 802 with advertisement data in any suitable manner. To illustrate, FIG. 8B shows advertisement stream 800 with advertisement data 804 included therein. As shown in FIG. 8B, advertisement data 804 has replaced a plurality of markers 802 within advertisement stream 800. In some examples, advertisement data 804 may overwrite one or more of markers 802. Advertisement data 804 may alternatively be inserted within advertisement stream 800 without replacing markers 802.

In step 706, advertisement stream 800 is delivered to access subsystem 104. Advertisement stream 800 may be delivered to access subsystem 104 in any of the ways described herein. For example, delivery subsystem 102 may transmit (e.g., broadcast, multicast, or narrowcast) advertisement stream 800 to media content access subsystem 104.

In some examples, advertisement stream 800 is one of a plurality of advertisement streams transmitted in parallel by delivery subsystem 102. In this manner, access subsystem 104 may select one of the advertisement streams that is most relevant to a user thereof for presentation to the user.

Figure 9:
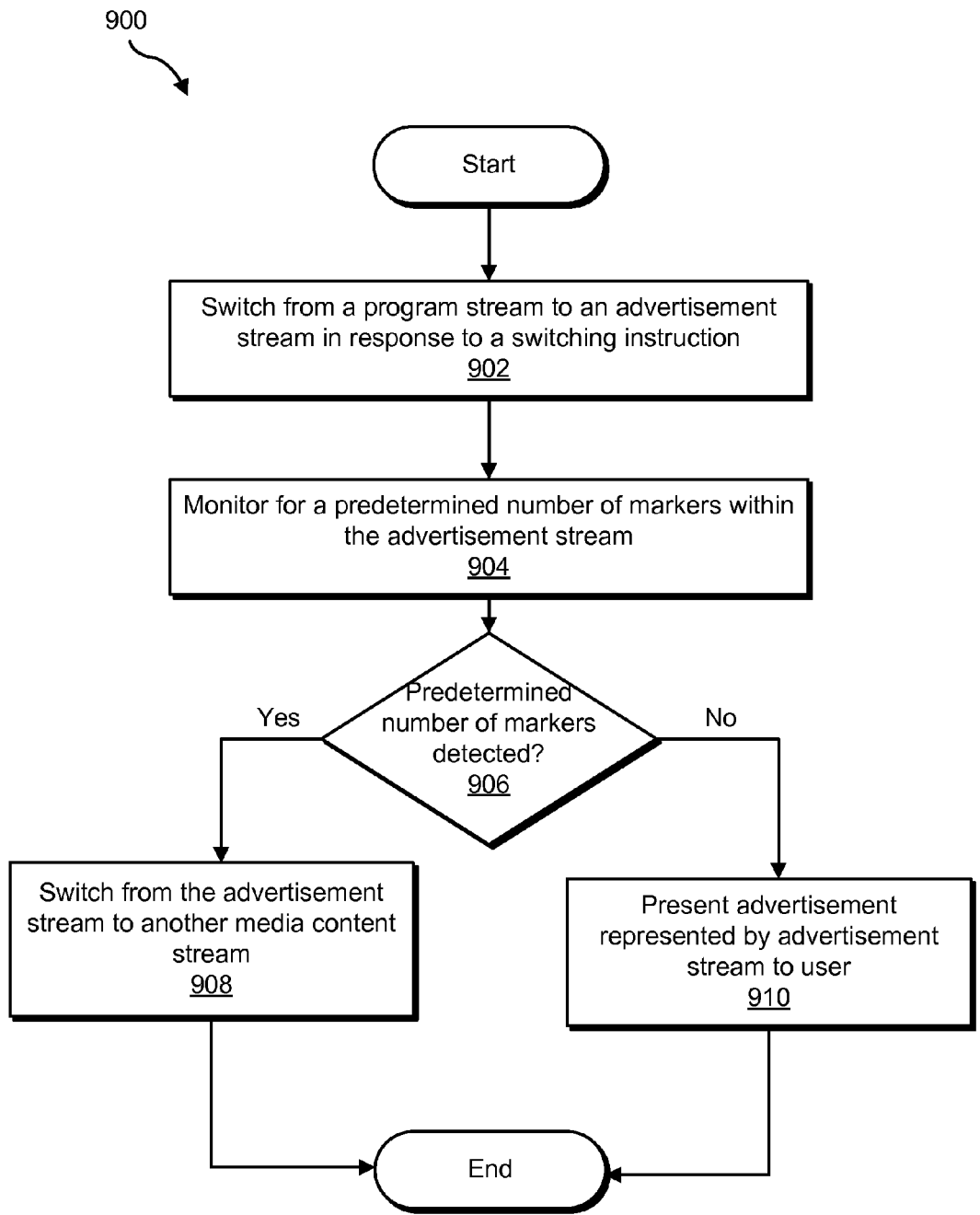
FIG. 9 illustrates an exemplary method of presenting an advertisement represented by an advertisement stream according to principles described herein.

FIG. 9 illustrates an exemplary method 900 of presenting an advertisement represented by an advertisement stream to a user of access subsystem 104. While FIG. 9 illustrates exemplary steps according to one embodiment, other embodiments may omit, add to, reorder, and/or modify any of the steps shown in FIG. 9.

In step 902, access subsystem 104 switches from a program stream to an advertisement stream in response to a switching instruction. The switching instruction may be provided by delivery subsystem 102 or in any other manner as may serve a particular application. For example, the switching instruction may include a data sequence within the program stream that indicates a beginning of an advertisement break within a media content program represented by the program stream.

Access subsystem 104 may be configured to switch from a program stream to an advertisement stream in any of the ways described herein. For example, media content stream switching facility 402 may be configured to switch from a program stream to an advertisement stream by tuning to or otherwise selecting the advertisement stream.

In step 904, access subsystem 104 monitors for a predetermined number of markers within the advertisement stream. For example, error detection facility 404 may analyze the advertisement stream as it is received by access subsystem 104 to determine whether the predetermined number of markers are included therein.

In some examples, the presence of a predetermined number of markers within an advertisement stream is indicative of an error associated with the advertisement stream. For example, the presence of a predetermined number of markers within an advertisement stream may be indicative of a failure to include advertisement data representative of at least one advertisement in the advertisement stream. The number of detected markers required to indicate an error associated with an advertisement stream may vary as may serve a particular application. For example, error detection facility 404 may be configured to detect at least two markers within an advertisement stream before determining that the advertisement stream has an error associated therewith.

In step 906, a determination is made as to whether the predetermined number of markers are detected within the advertisement stream. If the predetermined number of markers are detected, it may be determined that an error is associated with the advertisement stream. In response, as shown in step 908, access subsystem 104 recovers from the error associated with the advertisement stream by switching from the advertisement stream to another media content stream. In this manner, presentation of blank content within the advertisement stream to a user of access subsystem 104 may be minimized or eliminated.

In some examples, access subsystem 104 may switch back to the program stream if an error associated with the advertisement stream is detected. Alternatively, access subsystem 104 may switch to another advertisement stream if an error associated with the advertisement stream is detected. The other advertisement stream may be selected in accordance with any suitable heuristic. For example, the other advertisement stream may be selected based on relevancy to the user, in accordance with a user profile associated with the user, and/or based on any other factor as may serve a particular application. Access subsystem 104 may alternatively switch to any other type of media content stream as may serve a particular application.

Returning to step 906, if the predetermined number of markers are not detected within the advertisement stream, it may be determined that advertisement data is included within the advertisement stream. In response, as shown in step 910, an advertisement represented by the advertisement stream is presented to a user of access subsystem 104. The advertisement may be presented in any of the ways described herein. For example, presentation facility 406 may be configured to display or otherwise present the advertisement to a user of access subsystem 104.

Figure 10:
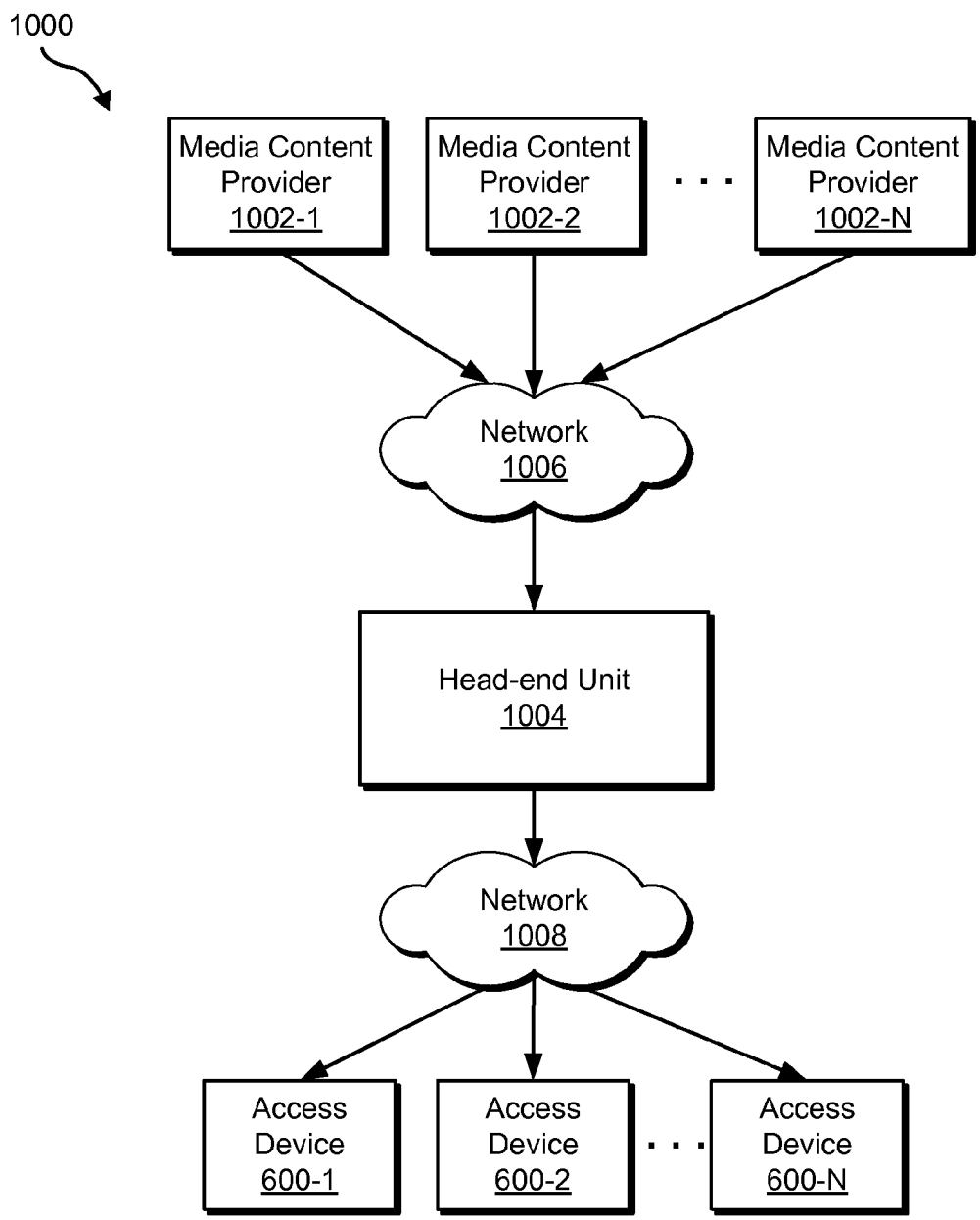
FIG. 10 illustrates an exemplary configuration wherein a plurality of media content providers are configured to communicate with a head-end unit according to principles described herein.

A specific implementation of the systems and methods described herein will now be described in connection with FIG. 10. FIG. 10 illustrates an exemplary configuration 1000 wherein content delivery subsystem 102 comprises a plurality of media content providers 1002-1 through 1002-N (collectively referred to herein as "media content providers 1002") configured to communicate with a head-end unit 1004 via a network 1006. Head-end unit 1004 may be configured to communicate with a plurality of access devices 600-1 through 600-N (collectively referred to herein as "access devices 600") via a network 1008. Networks 1006 and 1008 may include any of the networks described herein. In some examples, network 1006 and 1008 comprise a single network.

In some examples, media content providers 1002 may each include one or more components configured to provide one or more media content streams (e.g., one or more program streams and/or advertisement streams) to head-end unit 1004 via network 1006. In some alternative examples, one or more of the media content providers 1002 may be configured to provide one or more media content streams directly to head-end unit 1004 without transmitting data via network 1006.

Head-end unit 1004 may include one or more components configured to acquire media content from media content providers 1002 and distribute the media content to access devices 600 via network 1008. An exemplary head-end unit 1004 may include a video head-end and/or a video hub office configured to acquire and distribute national, regional, and/or local broadcast and video-on-demand media content to access devices 600. In some examples, head-end unit 1004 may be configured to generate and/or provide one or more advertisement streams to access devices 600.

In some examples, head-end unit 1004 may distribute media content to access devices 600 by transmitting a single transport stream (e.g., an MPEG transport stream) that comprises a plurality of multiplexed media content streams. In an MPEG encoding scheme, a single media content stream is represented by a plurality of elementary streams each representing a particular component of the media content contained within the media content stream. For example, a media content stream may be represented by a video stream, an audio stream, a data stream, and/or any other elementary stream as may serve a particular application. The video stream may include data representative of a video component of the media content contained within the media content stream, the audio stream may include data representative of an audio component of the media content contained within the media content stream, and the data stream may include data representative of one or more features associated with the media content contained within the media content stream. It will be recognized that additional or alternative elementary streams may be used to represent a particular media content stream.

In order to transmit and decode a single transport stream in real-time, each elementary stream that represents a particular media content stream may be divided into a plurality of packets. Each packet comprises a portion of an elementary stream.

Figure 11:
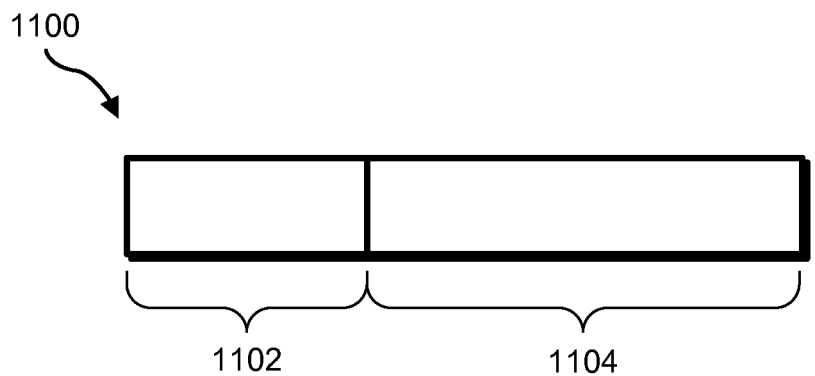
FIG. 11 illustrates an exemplary packet according to principles described herein.

FIG. 11 illustrates an exemplary packet 1100 that may be used in accordance with the systems and methods described herein. As shown in FIG. 11, packet 1100 may be divided into a header 1102 and a payload 1104. Header 1102 may be configured to include identification data associated with packet 1100, control data, and/or any other data associated with packet 1100 as may serve a particular application. For example, header 1102 may include a program identification ("PID") configured to identify a particular media content instance with which packet 1100 is associated. A PID may additionally or alternatively be configured to identify the particular elementary stream with which packet 1100 is associated. To illustrate, a PID value of "101" may be used to identify packet 1100 as being part of a video stream for a particular media content instance (e.g., an advertisement), a PID value of "102" may be used to identify packet 1100 as being part of an audio stream for the media content instance, and a PID value of "103" may be used to identify packet 1100 as being part of a data stream associated with the media content instance. In this manner, access subsystem 104 may identify an incoming packet 1100 and process the incoming packet 1100 accordingly.

Payload 1104 of packet 1100 may be configured to include data representative of a particular component of a media content instance. For example, payload 1104 may include data representative of a video component of a media content instance (e.g., an advertisement), data representative of an audio component of the media content instance, and/or any data associated with one or more features of the media content instance.

Figure 12:
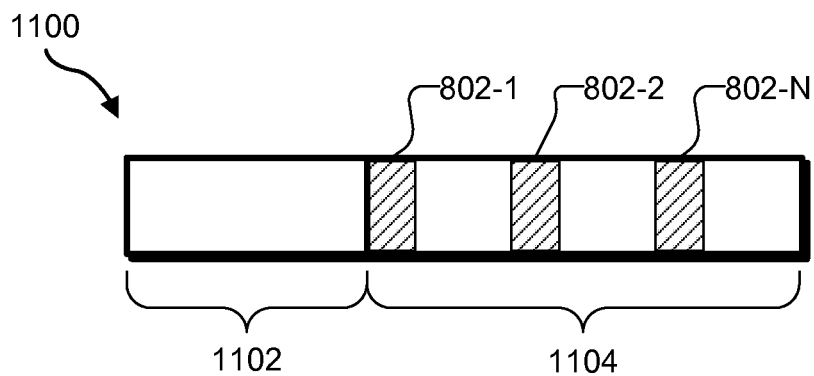
FIG. 12 illustrates an exemplary packet with a plurality of markers included therein according to principles described herein.

In some examples, markers may be included within an advertisement stream by including the markers within an elementary stream representing the advertisement stream. For example, markers may be included within a payload of a video stream, an audio stream, a data stream, and/or any other elementary stream representing an advertisement stream. To illustrate, FIG. 12 shows packet 1100 with a plurality of markers 802 included within payload 1104. Multiple markers 802 are shown to be included within payload 1104 for illustrative purposes only. In some alternative examples, a single marker 802 may be included within payload 1104. In yet other alternative examples, one or more markers 802 are included only within a subset of a plurality of packets 1100.

In some examples, markers 802 are included within a payload 1104 of one or more packets 1100 corresponding to a data stream that is associated with an advertisement stream. When advertisement data is subsequently included within the advertisement stream, the advertisement data may replace markers 802 within the payloads 1104 of the packets 1100 corresponding to the data stream. It will be recognized that markers 802 may additionally or alternatively be included within a video stream, audio stream, and/or any other elementary stream associated with a media content stream.

Figure 13:
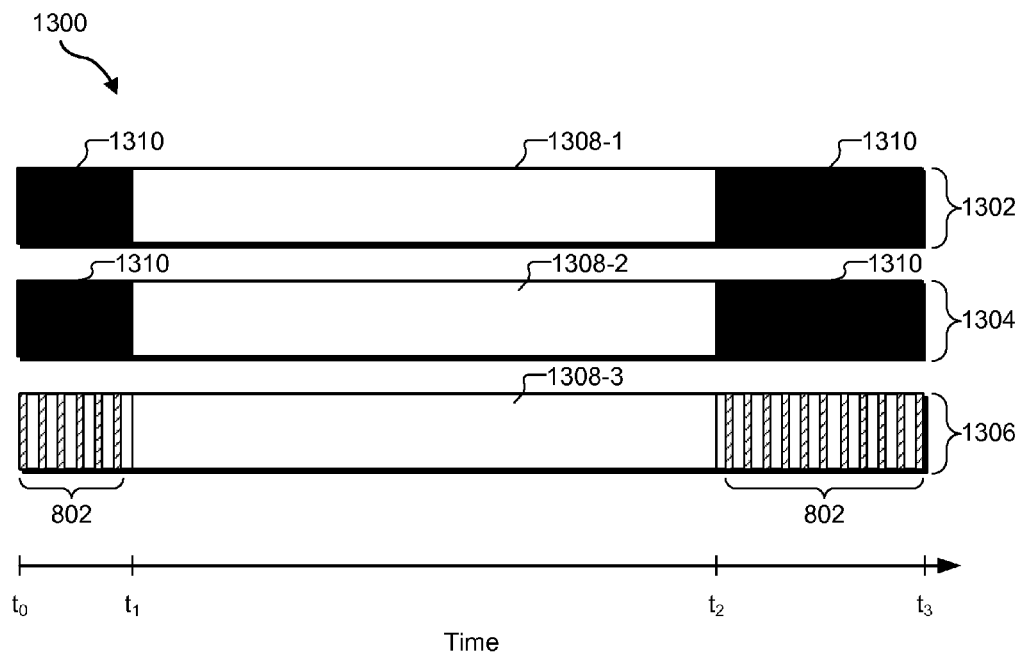
FIG. 13 shows an illustration of an advertisement stream containing periods of blank content and advertisement content according to principles described herein.

FIG. 13 shows an illustration of an advertisement stream 1300 containing periods of blank content and advertisement content. As shown in FIG. 13, advertisement stream 1300 may include a video stream 1302, an audio stream 1304, and a data stream 1306. An advertisement represented by advertisement data 1308-1 through 1308-3 (collectively referred to herein as "advertisement data 1308") is scheduled to be presented to a user during a time period between $t_1$ and $t_2$. Advertisement data 1308-1 is representative of a video component of the advertisement, advertisement data 1308-2 is representative of an audio component of the advertisement, and advertisement data 1308-3 is representative of a data component of the advertisement.

If access subsystem 104 switches to advertisement stream 1300 at any time in between times $t_1$ and $t_2$, access subsystem 104 will recognize that advertisement data 1308 is included within advertisement stream 1300 and will present the advertisement represented thereby accordingly. However, during times $t_0$ through $t_1$ and during times $t_2$ through $t_3$, advertisement stream 1300 includes blank content 1310 within video stream 1302 and audio stream 1304. Blank content 1310 may include data representative of a black video display and muted audio, for example.

To avoid presentation of blank content 1310, data stream 1306 may include one or more markers 802 during each time period corresponding to blank content 1310. As described herein, if access subsystem 104 switches to advertisement stream 1300 during a time period of blank content (e.g., during time period $t_0$ through $t_1$ or $t_2$ through $t_3$), access subsystem 104 may detect a presence of a predetermined number of markers 802 and switch to a different media content stream.

Figure 14:
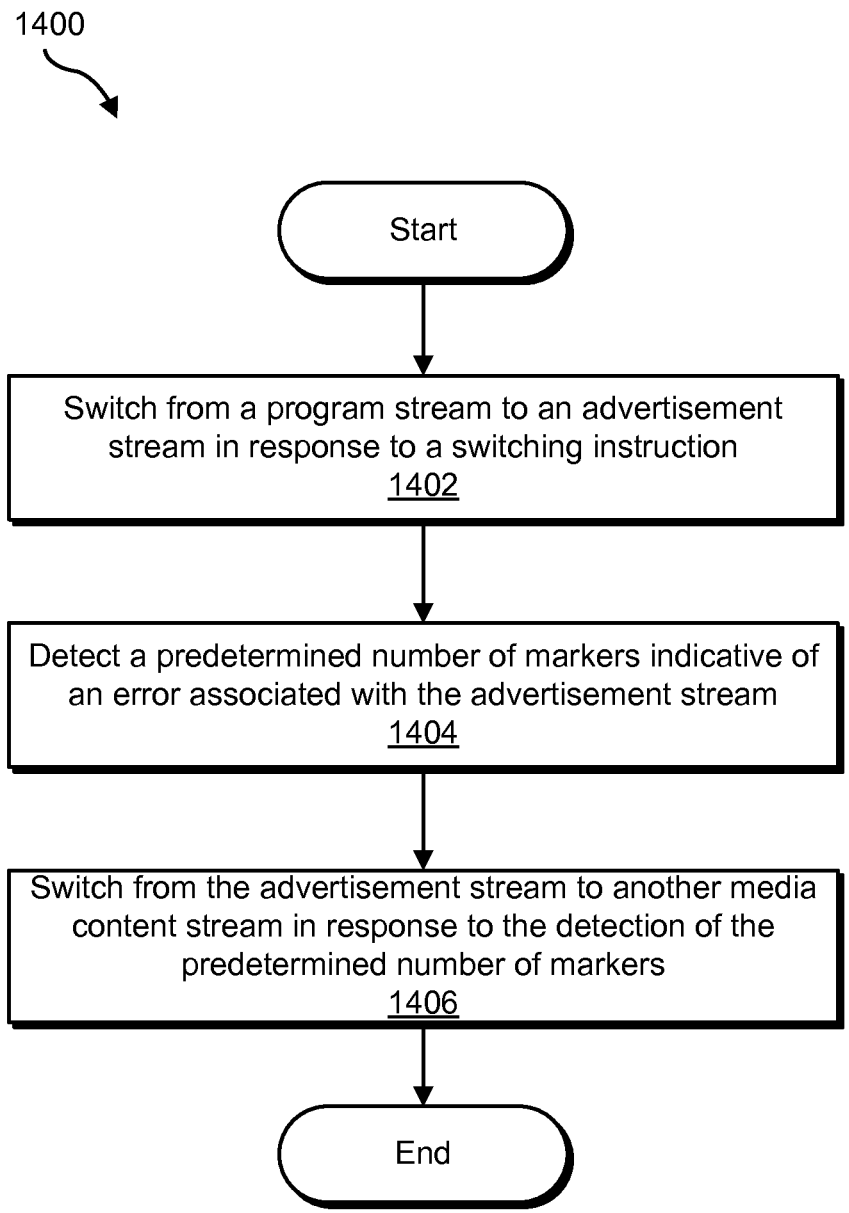
FIG. 14 illustrates an exemplary method of recovering from an error associated with an advertisement stream according to principles described herein.

FIG. 14 illustrates an exemplary method 1400 of recovering from an error associated with an advertisement stream. While FIG. 14 illustrates exemplary steps according to one embodiment, other embodiments may omit, add to, reorder, and/or modify any of the steps shown in FIG. 14.

In step 1402, an access subsystem (e.g., access subsystem 104) switches from a program stream to an advertisement stream in response to a switching instruction. The switching may be performed in any of the ways described herein.

In step 1404, a predetermined number of markers indicative of an error associated with the advertisement stream are detected. The predetermined number of markers may be detected in any of the ways described herein.

In step 1406, the access subsystem (e.g., access subsystem 104) may switch from the advertisement stream to another media content stream in response to the detection of the predetermined number of markers. The media content stream to which the access subsystem switches may include the program stream, another advertisement stream, or any other media content stream as may serve a particular application. Alternatively, the other media content stream media may include another advertisement stream.

As detailed above, the systems and methods described herein facilitate recovery from one or more errors associated with an advertisement stream. As an example, an exemplary method includes switching, by a media content access subsystem, from a program stream to an advertisement stream in response to a switching instruction received by the media content access subsystem, detecting, by the media content access subsystem, a predetermined number of markers included within the advertisement stream, the predetermined number of markers indicative of an error associated with the advertisement stream, and switching, by the media content access subsystem, from the advertisement stream to another media content stream in response to the detecting of the predetermined number of markers.

Another exemplary method includes switching, by a media content access subsystem, from a program stream to an advertisement stream in response to a switching instruction received by the media content access subsystem, determining, by the media content access subsystem, whether a predetermined number of markers are included within the advertisement stream, the predetermined number of markers indicative of an error associated with the advertisement stream, switching, by the media content access subsystem, to another media content stream if the media content access subsystem determines that the predetermined number of markers are included within the advertisement stream, and presenting, by the media content access subsystem, an advertisement represented by the advertisement stream if the predetermined number of markers are not included within the advertisement stream.

Another exemplary method includes generating, by a content delivery subsystem, an advertisement stream with a plurality of markers included therein, the plurality of markers configured to indicate an error associated with the advertisement stream if detected by a media content access subsystem, replacing, by the content delivery subsystem, at least one of the markers within the advertisement stream with advertisement data, and providing, by the content delivery subsystem, the advertisement stream to a media content access subsystem, and providing, by the content delivery subsystem.

An exemplary system includes a media content stream switching facility configured to switch from a program stream to an advertisement stream in response to a switching instruction and an error detection facility selectively and communicatively coupled to the switching facility and configured to detect a predetermined number of markers indicative of an error associated with the advertisement stream. The media content stream switching facility is further configured to switch from the advertisement stream to another media content stream in response to the detection of the predetermined number of markers.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   switching, by a media content access subsystem, from a program stream to an advertisement stream in response to a switching instruction received by the media content access subsystem;
   monitoring, by the media content access subsystem, for a predetermined number of markers included within the advertisement stream as the advertisement stream is received by the media content access subsystem;
   switching, by the media content access subsystem, from the advertisement stream to another media content stream if the predetermined number of markers is detected during the monitoring; and
   presenting, by the media content access subsystem, an advertisement represented by the advertisement stream if the predetermined number of markers are not detected during the monitoring.

2. The method of claim 1, wherein the another media content stream comprises the program stream.

3. The method of claim 1, wherein the another media content stream comprises another advertisement stream.

4. The method of claim 1, wherein the predetermined number of markers is indicative of an error associated with the advertisement stream.

5. The method of claim 1, wherein the predetermined number of markers comprises at least two markers.

6. The method of claim 1, wherein the advertisement stream comprises a plurality of elementary streams, and wherein the predetermined number of markers are included within one of the elementary streams.

7. The method of claim 6, wherein the plurality of elementary streams comprises at least a video stream and a data stream, and wherein the predetermined number of markers are included within the data stream.

8. The method of claim 6, wherein the plurality of elementary streams comprises at least an audio stream and a data stream, and wherein the predetermined number of markers are included within the data stream.

9. The method of claim 1, tangibly embodied as computer-executable instructions on at least one non-transitory computer-readable medium.

10. A system comprising:
a media content stream switching facility that switches from a program stream to an advertisement stream in response to a switching instruction; and
an error detection facility communicatively coupled to the media content stream switching facility and that monitors for a predetermined number of markers included within the advertisement stream as the advertisement stream is received by a media content access device; and
a presentation facility communicatively coupled to the media content stream switching facility and configured to control a presentation of content represented by the program stream and content represented by the advertisement stream;
wherein the media content stream switching facility is further configured to switch from the advertisement stream to another media content stream if the predetermined number of markers is detected during the monitoring; and
wherein the presentation facility is further configured to present an advertisement represented by the advertisement stream if the predetermined number of markers are not detected during the monitoring.

11. The system of claim 10, wherein the another media content stream comprises the program stream.

12. The system of claim 10, wherein the another media content stream comprises another advertisement stream.

13. The system of claim 10, wherein the advertisement stream comprises a plurality of elementary streams, and wherein the predetermined number of markers are included within one of the elementary streams.

14. The system of claim 13, wherein the plurality of elementary streams comprises at least a video stream and a data stream, and wherein the predetermined number of markers are included within the data stream.

15. The system of claim 10, wherein the media content stream switching facility and the error detection facility are implemented on a set-top box.

16. The system of claim 10, wherein the predetermined number of markers comprises at least two markers.

17. A system comprising:
an advertisement stream generation facility configured to
generate an advertisement stream with a plurality of markers included therein, the plurality of markers configured to indicate an error associated with the advertisement stream if detected by a media content access subsystem, and
replace at least one of the markers within the advertisement stream with advertisement data; and
a media content stream delivery facility communicatively coupled to the advertisement stream generation facility and configured to provide the advertisement stream to the media content access subsystem.

18. The system of claim 17, wherein the advertisement stream comprises a plurality of elementary streams, and wherein the generating comprises including the plurality of markers within one of the elementary streams.

19. The system of claim 18, wherein the plurality of elementary streams comprises at least a video stream and a data stream, and wherein the generating comprises including the plurality of markers within the data stream.

20. The system of claim 17, wherein the advertisement stream generation facility is implemented by a head-end unit.

\* \* \* \* \*